United States Patent Office 2,806,844
Patented Sept. 17, 1957

1

2,806,844

ALKYLENE OXIDE ADDITION PRODUCT OF COPOLYMER OF A STYRENE COMPOUND AND AN ALIPHATIC ALCOHOL

John Fred Gerecht, Douglaston, N. Y., and Irving Joseph Krems, Fort Lee, and Philip Weiss, Nutley, N. J., assignors to Colgate-Palmolive Company, Jersey City, N. J., a corporation of Delaware No Drawing. Application October 24, 1955, Serial No. 542,513

7 Claims. (Cl. 260—88.1)

The present invention relates to novel polyalkoxamer graft copolymers, and to a process for preparing the same.

Graft copolymers are a recent development in the field of polymeric chemistry. A survey of the literature indicates that the preparations of graft copolymers have been accomplished specifically by the polymerization of a monomer in the presence of a preformed polymer as indicated by J. Polymer Science, vol. 8, page 289 (1952), and vol. 9, page 61 (1952), or from a polymeric hydroperoxide as shown in J. Polymer Science, vol. 16, page 345 (1955). The preparation by the former method based upon chain transfer is limited in scope since the two homopolymers may be obtained in addition to the graft copolymer. A tedious fractionation in selected mixed solvents is required for the desired graft copolymer. The preparation from an autoxidized polymer yields graft copolymers with few links because of the low yields obtained during formation of the hydroperoxide groups. It is apparent that there are many difficulties involved in the published methods for preparation of graft copolymers which place restrictions upon the type, structure and composition of the products which can be formed thereby.

In accordance with the present invention, a new type of graft copolymer containing a predetermined balance of hydrophilic and hydrophobic units to impart a desired degree of surface activity to the product has been discovered which comprises a polyalkoxamer of a hydrophobic copolymer of a vinyl compound and an unsaturated aliphatic alcohol to form thereby a polymeric hydrophilic ether-containing chain on said copolymer.

The novel products of the present invention may be prepared in any suitable manner. In general, the grafting of the hydrophilic chains to the initial copolymer may be accomplished by the reaction or condensation of the copolymer containing the reactive alcoholic group with an epoxide compound. More particularly, a method which has been found to be conducive to commercial operation and produces a product in good yield and purity comprises the saponification of a copolymer of the vinyl compound and an ester of an unsaturated aliphatic alcohol so as to eliminate the ester grouping and free or liberate a reactive hydroxyl group, and condensing the resulting product with an epoxide compound such as an alkylene oxide.

The final products are essentially non-(cross-linked) in order to avoid rigidity to the molecule and provide hydrophilic tails on a hydrophobic backbone. As a result the adducts tend to be more soluble or dispersible in water or other polar solvents than the original copolymer and yet retain solubility in non-polar solvents. Such adducts have useful application in many fields of endeavor therefore.

The backbone copolymer should be selected so that it is essentially linear and hydrophobic with a sufficient number of potential points for grafting so as to permit desired variation in structure, composition and properties with varying proportions of the hydrophilic side-chains in the final product.

A type of copolymer which has been found to be particularly suitable as an initial reactant is a copolymer of an aromatic vinyl compound and an ester of an unsaturated aliphatic alcohol. Examples of the former material are styrene and substituted styrene compounds containing inert substituents such as alkyl styrenes, e. g. methyl and ethyl styrene; halogenated styrenes, e. g. p-chlorostyrene, 2,4 dichlorostyrene and m-bromostyrene; alkoxy styrenes, e. g. p-methoxystyrene; nitrogen-substituted styrenes, e. g. p-nitrostyrene and p-dimethylaminostyrene, and the like. Suitable examples of the ester monomers are the esters of the mono- unsaturated lower aliphatic monohydric alcohols having up to about 6 carbon atoms. It is preferred to use the esters derived from such alcohols and aliphatic carboxylic acids, preferably the lower fatty acid esters of the unsaturated alcohols, such as allyl acetate, allyl propionate, allyl butyrate, isopropenyl acetate, methallyl acetate, vinyl acetate, and the like.

The initial copolymer is known in the art, such as the copolymer of styrene and allyl acetate illustrated in J. Am. Chem. Soc., vol. 70, p. 1529 (1948). In known manner, products of varying composition, e. g. variations in molar ratio of styrene to allyl acetate, and varying molecular weight may be formed as desired, depending upon the concentrations of the monomers, their reactivities, initiator and other conditions of the reaction. For example, the above copolymer is formed from styrene and allyl acetate at 56° C. using a peroxide initiator such as benzoyl peroxide. Variations in copolymer composition provided the functional groups are not obscured may be effected by changing the initial molar concentrations of the monomers, and variations in molecular weight may be effected by changing the concentration of initiator.

It is preferred to employ copolymers wherein the molar ratio of the aromatic vinyl compound, e. g. styrene, to alcoholic compound is from about 1:1 to about 10:1, and usually up to about 5:1. The copolymers may have any suitable molecular weights but optimum effects are obtained with copolymers having a molecular weight up to about 100,000 and usually up to about 10,000.

The copolymer containing the functional alcoholic groups in the form of esters may be converted to the copolymer containing a free hydroxyl group, followed by condensation with an epoxide compound to form the polyalkoxamer side chain. This novel type of graft copolymer may be illustrated by the following typical diagrammatic equations showing the saponification of poly-(styrene co allyl acetate) to the allyl alcohol derivative using sodium methylate as a saponifying agent, and the subsequent addition of ethylene oxide:

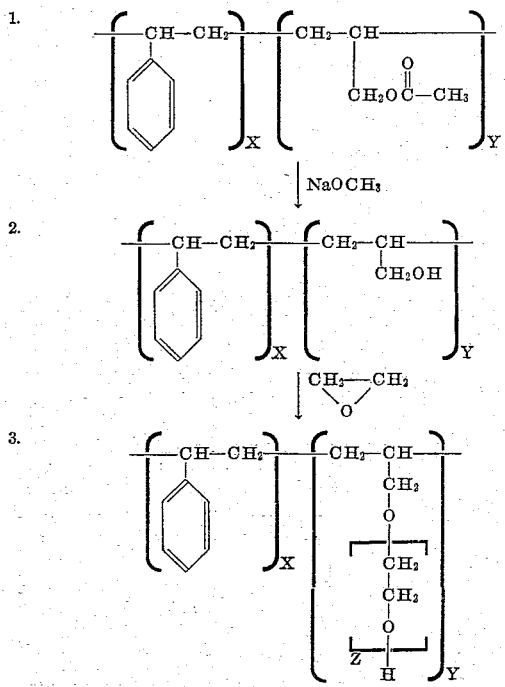

wherein X is the number of moles of styrene and Y is the number of moles of allyl compound which determines the composition of the initial copolymer, and Z is the number of moles of ethylene oxide per allyl alcohol grouping grafted on the copolymer.

The first reaction with sodium methoxide as the saponifying agent represents an effective means of converting the ester groups to a product having a high alcoholic content which is obtainable in high yield and purity. For example, it is possible to obtain substantially complete saponification of the available ester groups in the styrene-allyl alcohol system. This means of obtaining poly(styrene co allyl alcohol) and similar copolymers by saponification of the ester is a significant step since the copolymers of styrene or the like and unsaturated aliphatic alcohols may not be copolymerizable or readily available in many instances.

The ester-containing copolymer may be saponified by any suitable saponifying agent. There are a number of known basic saponifying agents, particularly the alkali metal bases. Suitable examples are sodium hydroxide, potassium hydroxide, sodium ethoxide, sodium methoxide, potassium methoxide, sodium hydride, sodamide, etc.

Alternatively, the ester-containing copolymer may be hydrolyzed to form the alcoholic copolymer by other suitable methods. Thus the initial copolymer may be treated with an acidic or neutral hydrolyzing agent so as to split the ester group and liberate the free alcoholic group. Examples of suitable acidic hydrolyzing agents are the mineral acids such as sulphuric and hydrochloric acids, and a neutral hydrolyzing agent is water at an elevated temperature and under pressure. In general, hydrolysis reactions involving an ester group with a hydrolyzing agent to liberate the corresponding free alcohol and acid are known in the art.

The saponification or similar hydrolytic reaction may be conducted under varying conditions. The reaction is effected by mixing suitable proportions of the reactants in an inert organic solvent so as to form a miscible system. In general, substantially stoichiometric or equivalent ratios of saponifying agent to the number of ester groups may be employed, but it is preferred to use an excess of the base to insure maximum saponification of the ester groups. Accordingly, the amount of saponifying agent per ester group is usually from about 1:1 to about 10:1 molar ratio in practice. Generally, the saponification may be conducted at room or elevated temperatures as desired but it is preferred to use elevated temperatures up to about 100° C. to accelerate the reaction. Any suitable reaction medium, depending upon the hydrolyzing agent, may be employed but it is preferred to utilize such organic solvents forming a miscible system. Suitable inert organic solvents are lower ketones (e. g. acetone, methyl ethyl ketone), the lower nitriles (e. g. acetonitrile), hydrocarbons (e. g. benzene, hexane), chlorinated hydrocarbons (e. g. dichlorobenzene, ethylene dichloride), alcohols (e. g. methyl and ethyl alcohol) and suitable mixtures thereof.

The resulting alcoholic copolymers are insoluble usually in the reaction mixture and precipitate readily or may be concentrated with facility. The product may be separated from the reaction mixture in any suitable manner and further purified or subjected to the epoxidation reaction directly as desired.

The alcoholic copolymer product is to be treated with an alkylene alpha, beta oxide to form the polyalkoxamer condensation products as indicated in the second reaction above. The term "polyalkoxamer" refers to the repeating alkylene oxide radical in the chain attached to the propyl group derived from the allyl alcohol shown above, which may be substituted or unsubstituted. It is preferred to use the lower alkylene alpha beta oxides such as ethylene oxide, propylene oxide, butylene oxide, etc., which by reaction with the hydroxyl group, results in the formation of the polyalkoxamer chain. This chain may contain inert substituents or radicals of an aliphatic, aromatic or heterocyclic structure. For example, such products may be prepared by the use of epoxides such as glycidyl acetate, glycidyl phenyl ether and the like which yield polyalkoxamer chains containing aliphatic and aromatic substituents, etc.

Any desired amount of epoxide compound may be condensed to form the ether sidechains. In addition to one molecular equivalent, the addition of increasing amounts will have the effect of changing in a desired manner the hydrophilic character of the sidechains and yielding final products containing linkages such as $-(CH_2CH_2O)n$, in the case of the reaction of the hydroxyl group with ethylene oxide. Suitable examples include the addition of one, two, six, ten, twenty-five, fifty and one hundred moles of alkylene oxide or similar epoxide compound per hydroxyl group. In general, there should be added at least about 0.5 equivalents of epoxide compound per alcohol linkage in the product in order to obtain optimum effects in surface activity and water-solubility or dispersibility.

The alkylene oxide or similar epoxide compound may be mixed or passed into the alcoholic copolymer at any suitable temperature and pressure. If desired elevated temperatures such as 100–250° C. and superatmospheric pressure may be employed depending upon the quantity and type of alkylene oxide in the system. The reaction is preferably conducted in a substantially anhydrous medium and in the presence of an inert organic solvent, such as dioxane, or hydrocarbons (e. g. benzene or xylene) or halogenated aromatic hydrocarbons (e. g. dichlorobenzene). In general, it is undesirable to employ reactive solvents such as ethyl alcohol or an aqueous medium since such systems will tend to form polyalkylene glycols or ethers, producing a heterogeneous mixture rather than the desired graft copolymer.

The final product may be concentrated or precipitated from the solvent, and, if desired, further purified in any particular manner such as by re-precipitation from suitable solvents. There are obtained solid materials which exhibit variable surface activity and solubilities, depending upon the type of initial copolymer and hydrophilic ether sidechains. It is characteristic of this invention that this relationship of hydrophobic to hydrophilic portions of the final product may be varied as desired, depending upon the intended use for a given product. It is readily possible to select the copolymer and the length and type of ether sidechains so that the product shows affinities toward both aqueous and fatty or oily matters, or in which the affinity for one type materially exceeds the affinity for the other type. The products are further characterized by the fact that they are essentially non-ionic and therefore are compatible with many different types of materials. They may be heated to reasonably elevated temperatures without materially affecting the structure or properties of the products, such as would occur by cross-linking. Thus, the products may be used as emulsifying, wetting and thickening agents, or anti-static agents, etc., in detergent compositions and cosmetics such as shampoos and lotions, in textile-treating compositions, in the manufacture of dispersions, gels, etc.

The following specific examples are further illustrative of the nature of the present invention, but it is to be understood that the invention is not limited thereto. The compositions are prepared in the usual manner and all amounts of the various ingredients are by weight unless otherwise specified.

*Example I*

A mason jar is charged with 10.4 g. (0.1 mole) of styrene, 90.0 g. (0.9 mole) of allyl acetate and 1.82 g. (0.81 mole percent) of benzoyl peroxide. The jar is sealed and the reaction mixture is heated to 60° C. in a constant temperature bath for 72 hours. The viscous reaction mixture is cooled and then slowly dripped into 1500 ml. of methanol with stirring. A white solid is obtained which is filtered and dried; yield 8 g. Analysis: Found C, 82.93; H, 7.51; mol. wt. 3500 (Rast method). On the basis of the analysis, the composition of poly(styrene co allyl acetate) is 1.7 styrene units per allyl acetate.

Twenty grams of this copolymer is dissolved in 150 ml. of methyl ethyl ketone. This mixture is refluxed and stirred while there is added 12 ml. of 25% sodium methoxide in methanol solution. The resulting turbid mixture is refluxed with stirring for a total of 9 hours. A clear solution is obtained by the addition of 100 ml. of chloroform to the viscous mixture, which is dripped into 2 liters of Skellysolve B (hexane). A white solid is precipitated which is filtered and dried to a yield of 19 grams. The product is poly(styrene co allyl alcohol) having a composition of about 2.5 styrene units per allyl alcohol. Infrared analysis discloses that there was substantially complete conversion of the ester to the poly(styrene co allyl alcohol).

Five grams of poly(styrene co allyl alcohol) of the above composition is dissolved in 150 ml. of dioxane and 0.25 g. of sodium methoxide is added as a catalyst. At reflux temperature, ethylene oxide is bubbled through the solution for 5 hours. On cooling the reaction mixture, a white solid precipitates from the solution which is filtered and dried to a yield of 1.2 g. On the basis of the hydroxyl value (OH=2.20%), 10.2 ethylene oxide units per propyl alcohol group are added to the poly(styrene co allyl alcohol). The resulting product is water-dispersible.

A second fraction is obtained by concentrating the dioxane filtrate under vacuo and triturating the residue with Skellysolve B, which is filtered and dried to a yield of 2.9 g. The hydroxyl value (OH=2.83%) indicates that in this fraction 6.3 units of ethylene oxide per propyl alcohol group are grafted on the poly(styrene co allyl alcohol). This product is substantially water-insoluble but is oil-soluble.

*Example II*

A poly(styrene co allyl alcohol) material is prepared in accordance with Example I. Ethylene oxide is bubbled through a 3% solution of this copolymer in dioxane containing sodium methoxide as a catalyst for 33 hours while refluxing. On cooling the reaction mixture, a white solid precipitates from the solution and has a hydroxyl value of 1.31%, indicating that 22 ethylene oxide units per propyl alcohol group are added to the backbone copolymer. The resulting polyethoxamer poly(styrene co allyl alcohol) is water-dispersible.

A second fraction is obtained also by concentrating the dioxane filtrate and triturating the residue with Skellysolve B resulting in a product which has a hydroxyl value of 1.06%, indicating that 29 ethylene oxide units per propyl alcohol group are grafted on the poly(styrene co allyl alcohol). This polyalkoxamer product is primarily oil-soluble.

While various specific examples of preferred compositions and methods embodying the present invention have been described above, it will be apparent that many changes and modifications may be made in the methods of procedure and that a wide variety of specific reagents may be employed in carrying out the procedure. It should therefore be understood that the examples cited and the particular proportions, methods of procedure, and compounds set forth above are intended to be illustrative only and are not intended to limit the scope of the invention.

Having thus described the invention, what is claimed is:

1. An alkylene alpha, beta oxide addition product of a copolymer of (a) a styrene compound selected from the group consisting of styrene and styrene bearing inert substituents and (b) a mono-unsaturated aliphatic mono-hydric alcohol having 2 to 6 carbon atoms, said addition product being substantially free of ionic groups.

2. An addition product in accordance with claim 1 wherein said alkylene oxide is ethylene oxide.

3. An alkylene alpha, beta oxide addition product of a copolymer of (a) a styrene compound selected from the group consisting of styrene and styrene bearing inert substituents and (b) allyl alcohol, said addition product being substantially free of ionic groups.

4. An addition product in accordance with claim 3 wherein said copolymer has a molar ratio of said styrene compound to said allyl alcohol of about 1:1 to 10:1.

5. An ethylene oxide addition product of a copolymer of styrene and allyl alcohol.

6. A process which comprises heating a copolymer of styrene and allyl acetate having a molar ratio of styrene to allyl acetate of about 1:1 to 10:1 with a saponifying agent in an inert organic solvent and forming as a reaction product a copolymer of styrene and allyl alcohol, mixing said latter copolymer with ethylene oxide in the presence of an inert organic solvent at a temperature from about 100 to 250° C. and forming an ethylene oxide addition product of said copolymer of styrene and allyl alcohol.

7. A process which comprises mixing a copolymer of (a) a styrene compound selected from the group consisting of styrene and styrene bearing inert substitutents and (b) a mono-unsaturated aliphatic monohydric alcohol having 2 to 6 carbon atoms with an alkylene alpha, beta oxide in the presence of an inert organic solvent at a temperature from about 100 to 250° C. and forming an addition product of said alkylene oxide and said copolymer.

References Cited in the file of this patent

UNITED STATES PATENTS

| | | |
|---|---|---|
| 2,599,028 | Tawney | June 3, 1952 |
| 2,630,430 | Shokal | Mar. 3, 1953 |
| 2,660,563 | Banes | Nov. 24, 1953 |